United States Patent
Wakumoto et al.

(10) Patent No.: US 9,215,146 B2
(45) Date of Patent: Dec. 15, 2015

(54) SWITCH IDENTIFICATION

(75) Inventors: Shaun Wakumoto, Roseville, CA (US);
Dick T Fong, Sacramento, CA (US);
Nathan Jenne, Lincoln, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 273 days.

(21) Appl. No.: 13/524,670

(22) Filed: Jun. 15, 2012

(65) Prior Publication Data

US 2013/0336165 A1 Dec. 19, 2013

(51) Int. Cl.
*H04L 12/28* (2006.01)
*H04J 1/16* (2006.01)
*H04L 12/24* (2006.01)

(52) U.S. Cl.
CPC *H04L 41/12* (2013.01); *Y02B 60/43* (2013.01)

(58) Field of Classification Search
USPC .......... 370/252, 335, 342, 392, 135, 221; 455/458
See application file for complete search history.

(56) References Cited

U.S. PATENT DOCUMENTS

| 7,049,937 | B1 | 5/2006 | Zweig et al. |
| 7,936,671 | B1 | 5/2011 | Mater et al. |
| 8,443,065 | B1 * | 5/2013 | White ................ 709/222 |
| 2008/0101250 | A1 * | 5/2008 | McGee et al. ........... 370/252 |
| 2008/0186875 | A1 | 8/2008 | Kitani |
| 2008/0219184 | A1 * | 9/2008 | Fowler et al. ........... 370/254 |
| 2011/0110241 | A1 * | 5/2011 | Atkinson et al. ........ 370/242 |
| 2011/0244698 | A1 | 10/2011 | Jacks et al. |
| 2012/0154165 | A1 * | 6/2012 | Bower et al. ........... 340/687 |
| 2013/0176892 | A1 * | 7/2013 | Shukla ................ 370/254 |

OTHER PUBLICATIONS

"Cable IQ Qualification Tester"; Fluke Networks; 2 pages.

* cited by examiner

*Primary Examiner* — Edan Orgad
*Assistant Examiner* — Sithu Ko
(74) *Attorney, Agent, or Firm* — Hewlett Packard Enterprise Patent Department

(57) ABSTRACT

An example switch in accordance with the present disclosure is to process a command to determine desired identification information; generate a link layer discovery protocol (LLDP) frame based at least in part on the desired identification information, wherein the LLDP frame comprises an optional type-length-value (TLV) that causes a second switch to enable a light source; and transmit the LLDP to the second switch.

9 Claims, 6 Drawing Sheets

SWITCH IDENTIFICATION

BACKGROUND

In the networking technology space, a switch is generally a network control device that enables networked devices to communicate with each other in an efficient manner. For example, a switch may serve to connect computers, printers, routers, servers, patch panels, and/or other switches within a building or campus to form a local area network (LAN) and to enable efficient communication therebetween. These connections may be made via cable interconnects such as twisted-pair cables, Ethernet cables, crossover cables, coaxial cables, optical fiber cables, and the like. The cables may include modular connectors or plugs on each end of the cable that insert into ports on the network devices. For example, an Ethernet over twisted-pair cable with an 8P8C plug on each end may interconnect two switches by interconnecting a port on one switch with a port on the other switch. Indeed, in most cases, numerous cables interconnect the ports on the network devices, and therefore create a vast web of cabling within, e.g., a network wiring closet.

BRIEF DESCRIPTION OF THE DRAWINGS

Examples are described in the following detailed description and in reference to the drawings, in which.

DETAILED DESCRIPTION

Figure 1:
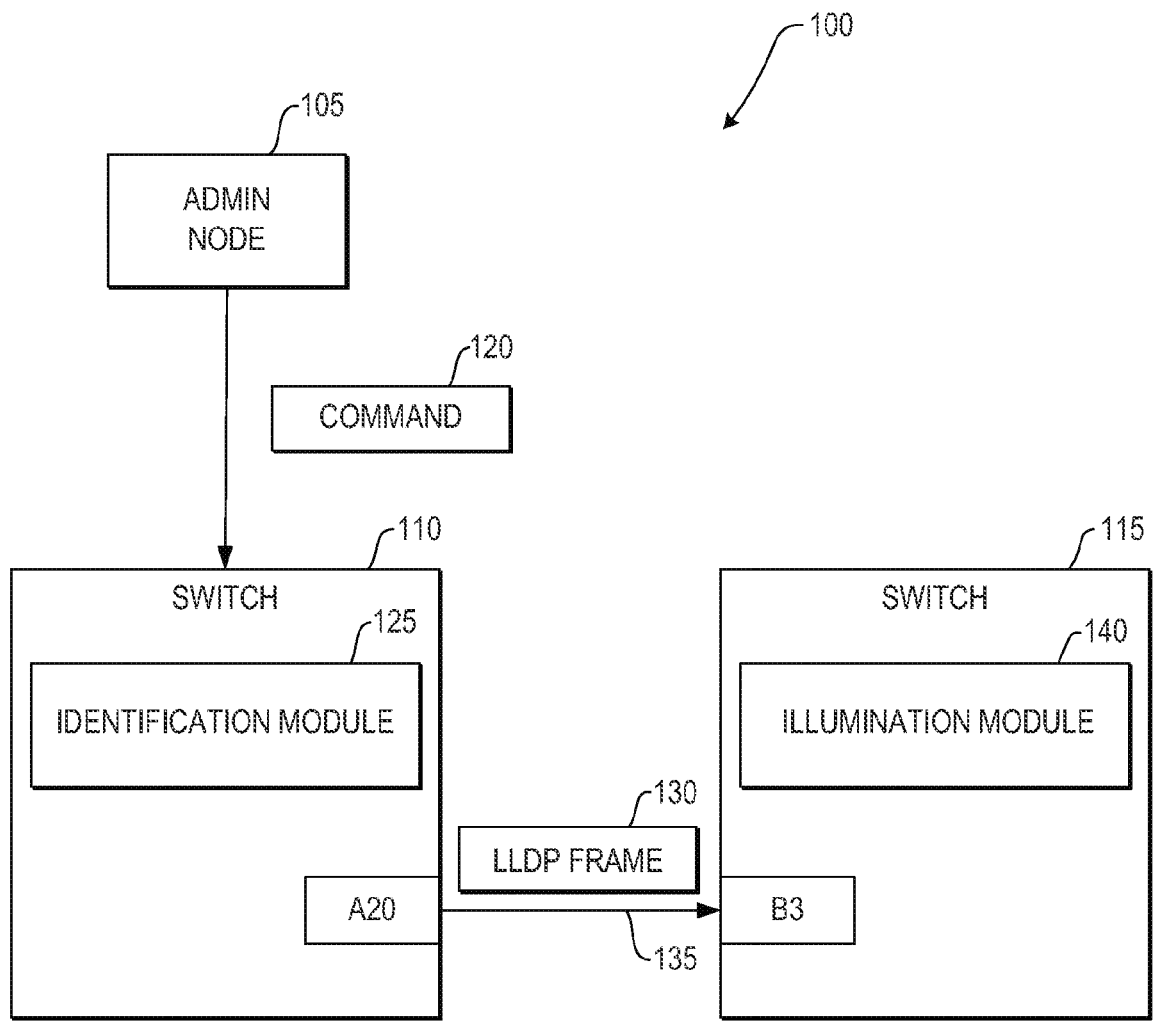
FIG. 1 depicts an example system in accordance with an implementation.

Various aspects of the present disclosure provide a novel and previously unforeseen approach to identify connections within a network. More particularly, various aspects of the present disclosure utilize signaling between network devices to identify interconnections between network devices.

As discussed above, current networks include a vast web of cabling to interconnect ports on various network devices. This web of cabling is difficult to maintain and keep organized, and even more difficult for a technician to navigate when the technician needs to troubleshoot, reconfigure, or otherwise service aspects of the network. For example, typical wiring closets bundle and tie up cables to keep them out of the way of the network devices. While this bundling helps create a clear view of the ports and associated port light sources on the network devices, the arrangement is problematic for technicians because it is difficult to determine both ends of a cable. That is, the technician cannot readily determine interconnections, and is often times forced to tug on a cable to identify the other end. This action is not suggested because it may damage the cable, network device, and/or port. Other actions such as color coding or unraveling the entire bundle are better from the perspective of damaging the equipment, but are inefficient due to the time requirement. Similarly, the action of creating a mapping of all interconnections is inefficient, in addition to being difficult to keep up-to-date.

Aspects of the present disclosure address at least the above-mentioned problems associated with network device interconnection identification by providing an approach to utilize a command to identify interconnections between network devices. In particular, aspect of the present disclosure utilize the Institute of Electrical and Electronics Engineers (IEEE) 802.1AB Link Layer Discovery Protocol (LLDP) to transmit commands that cause light sources associated with ports and/or switches to illuminate and thereby clearly show interconnections between ports and/or network devices. Among other things, this approach enables inefficiencies and risks associated with current approaches to be mitigated.

In one example in accordance with the present disclosure, a switch is provided. The switch comprises a communication interface and an identification module. The communication interface is to receive a command (e.g., from an administrator sitting in front of a computer) and pass the command along to the identification module. The identification module is to process the command to determine desired identification information (e.g., the administrator wants to identify the port on switch B connected to port A20 on switch A). Based at least in part on the desired identification information, the identification module is to generate a LLDP frame comprising an optional type-length-value, (TLV) that causes a second switch to perform an identification function. The optional TLV may comprise, for example, a TLV type, TLV length, organizationally unique identifier, organizationally defined subtype, port enable and disable instruction, blink instruction, and duration instruction.

An example identification function performed at the second switch may comprise, for example, enabling or blinking a light source associated with the receiving port. Alternatively or in addition, the identification function may comprise enabling or blinking a port light source associated with the receiving port and disabling all other port light sources associated with the second switch. Alternatively or in addition, the identification function may comprise enabling or blinking a chassis locator light source associated with the second switch. Alternatively or in addition, the identification function may comprise enabling all port light sources or blinking all port light sources associated with the second switch. Alternatively or in addition, the identification function may comprise blinking all port light sources associated with the second switch and then blinking at least one port light source associated with the second switch, or vice versa.

In a further example in accordance with the present disclosure, another switch is provided. The switch comprises a communication interface and an illumination module. The communication interface is to receive a LLDP frame from another switch, wherein the LLDP frame comprises an optional TLV that causes the switch to perform an identification function. The illumination module is to receive the LLDP frame from the communication interface and process the LLDP frame to determine the optional TLV. Based at least in part on the optional TLV, the switch is to perform the identification function, such as one or more of the identification functions mentioned above.

In yet another example in accordance with the present disclosure, a non-transitory machine readable medium is provided. The non-transitory computer-readable medium comprises instructions which, when executed, cause a switch to process a command to determine desired identification information (e.g., an administrator wants to identify the port connected to port A20 on switch A). The instructions further cause the switch to generate a LLDP frame based at least in part on the desired identification information, wherein the LLDP frame comprises an optional TLV that causes a second switch to enable a light source, and to transmit the LLDP to the second switch. Depending on the implementation, the light source associated with the second switch may be a port light source or a chassis light source.

FIG. 1 depicts an example system 100 in accordance with an implementation. The system 100 comprises an admin node 105, a first switch 110, and a second switch 115. It should be readily apparent that the system 100 depicted in FIG. 1 represents a generalized illustration and that other components may be added or existing components may be removed, modified, or rearranged without departing from a scope of the present disclosure.

The admin node 105 may be hardware and/or software element that enables an administrator to automatically and/or manually issue a command 120 to the first switch 110. For example, the admin node 105 may be a computer, console, web interface, server, terminal, workstation, software application, command-line interface, Telnet window, or the like, or combination thereof. Depending on the implementation, the administrator may be a user or an automated process. The command issued by the admin node 105 may comprise desired identification information. For example, an administrator may cause the admin node 105 to issue a command to the first switch 110 to identify a particular port on the second switch 115. This may be helpful, for example, in a situation where a remote administrator desires to identify both ends of a cable to a technician on-site in a data center. The desired identification information in the command 120 issued by the admin node 105 may comprise, for example, a switch identifier (e.g., switch MAC address), a port identifier (e.g., port A20), a desired identification function (enable/blink receiving port LED and/or enable/blink receiving switch chassis LED), etc. Such information may be used by the first switch 110 to construct another command destined for the second switch 115 which causes an appropriate light source on the second switch 115 to illuminate (e.g., a port LED associated with the receiving port).

The first switch 110 and second switch 115 may be generally understood as computer networking devices configured to connect network devices (e.g., computers, printers, routers, servers, patch panels, and/or other switches) and communicate information therebetween. In particular, the first switch 110 and second switch 115 may perform functions such as receiving data packets, determining an output port for each packet, and/or outputting each packet appropriately.

The first switch 110 may comprise an identification module 125. The identification module 110 may comprise software, hardware, or a combination of both. For example, the identification module may comprise instructions executable by a processor, an application specific integrated circuit (ASIC), a logic device, or combination thereof. The identification module 110 may receive the command 120 from the admin node 105 and process the command 120 to determine desired identification information included therein. As mentioned above, such desired identification information may comprise a switch identifier (e.g., switch MAC address), a port identifier (e.g., port A20), and a desired identification function.

Based at least in part on this desired identification information, the identification module 125 may generate a link layer discovery protocol (LLDP) frame 130 to be sent to the second switch 115. The LLDP frame 130 may comprise an optional type-length-value (TLV) that causes the second switch 115 to perform an identification function. The identification function may be, for example, enabling or blinking a port light source on the second switch 115 associated with the receiving port. For example, and with reference to FIG. 1, the optional TLV within the LLDP frame 130 may be sent from port A20 on the first switch 110 to port B3 on the second switch 115 via an Ethernet cable 135 coupling port A20 to port B3. An illumination module 140 on the second switch 115 may receive this LLDP frame 130 and cause the port LED associated with port B3 to enable or blink. Alternatively or in addition, the illumination module 140 may cause the port LED associated with port B3 to enable/blink and additionally disable all other port LEDs so that the port LED associated with port B3 is more apparent to a technician. Alternatively or in addition, the illumination module 140 may cause a chassis locator light source associated with the second switch to illuminate/blink no that a technician can identify the particular switch when, e.g., a plurality of switches are present. Alternatively or in addition, the illumination module 140 may cause all port LEDs associated with the second switch 115 to enable/blink so that a technician can more readily identify the particular switch when, e.g., a plurality of switches are present. Alternatively or in addition, the illumination module 140 may cause all port LEDs associated with the second switch 115 to enable/blink and then enable/blink one port LED associated with the second switch 115, or vice versa.

Figure 2:
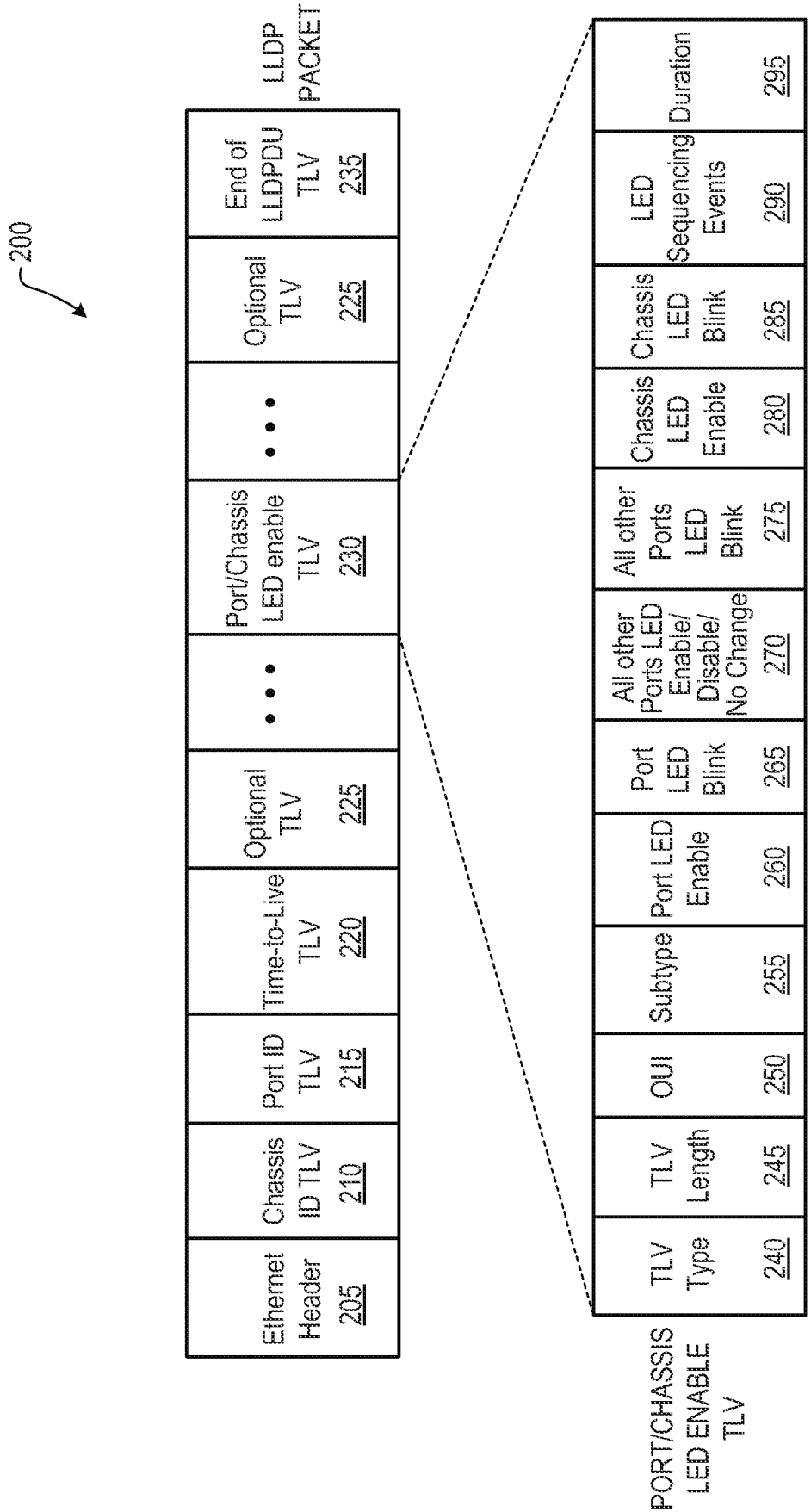
FIG. 2 depicts an example LLDP frame in accordance with an implementation.

FIG. 2 depicts an example LLDP frame 200 in accordance with an implementation. The LLDP frame 200 comprises an Ethernet header 205, a chassis ID TLV 210, a port ID TLV 215, a time-to-live TLV 220, optional TLVs 225, a port/chassis LED enable TLV 230, and an end of LLDPDU TLV 235. As mentioned above, this LLDP frame 200 may be generated by an identification module of a switch in response to receiving a command with desired identification information from an admin node.

The Ethernet header 205 may comprise a preamble, destination MAC address, source MAC address, and Ethertype. The chassis ID TLV 210 may represent the chassis identification for the device that transmitted the LLDP frame (e.g., the first switch 110 in FIG. 1). The port ID TLV 215 may represent the identification of the specific port that transmitted the LLDP frame (e.g., port A20 of the first switch 110 in FIG. 1). The optional TLVs 225 may represent custom or organizational specific commands per the IEEE 802.1AB protocol. The port/chassis LED enable TLV 230 may be an optional TLV that enables one device to cause another device to illuminate one or more port light sources and/or chassis light sources. The time-to-live TLV 220 may represent the length of time that information contained in the LLDP frame shall be valid. The end of LLDPDU TLV 235 may mark the end of data.

With specific respect to the port/chassis LED enable TLV 230, this TLV may comprise a TLV type field 240 (e.g., 7 bits), a TLV length field 245 (e.g., 9 bits), an organizationally unique identifier (OUI) field 250 (e.g., 24 bits), a subtype field 255 (e.g., 5 bits), a port LED enable field 260 (e.g., 1 bit), a port LED blink field 265 (e.g., 1 bit), an all other ports LED enable/disable/no change field 270 (e.g., 2 bits), an all other ports LED blink field 275 (e.g., 1 bit), a chassis LED enable field 280 (e.g., 1 bit), a chassis LED blink field 285 (e.g., 1 bit), a LED sequencing event field 290 (e.g., 3 bits) and/or a duration field 265 (e.g., 14 bits).

The port LED enable field 260, when set, may cause a switch to illuminate a port light source such as an LED associated with the port that received the LLDP frame. The port LED blink field 265, when set, may cause the switch to toggle the LED to provide a blinking effect. The all other ports LED enable/disable/no change field 270 may be used to enable, disable, or not change all other port LEDs besides the receiving port when received. The all other ports LED blink field 275 may be used to blink all other port LEDs besides the receiving port when received. Such fields, when set, may allow an administrator to, e.g., disable all other port LEDs, and thereby make the one receiving port LED that is illuminated or blinking more visible to an on-site technician. The chassis LED enable field 280 may cause the switch to enable a chassis LED associated with the switch that receives the LLDP frame. The chassis LED blink field 285 may cause the switch to blink a chassis LED associated with the switch that receives the LLDP frame. The LED sequencing event field 290 may be used in combination with the above-mentioned fields to sequence the illuminations. For example, the sequence field 290 may be used with the port LED enable field 260, port LED blink field 265, and/or enable all other ports LED field 270 to cause multiple port LEDs to enable and then enable/blink the receiving port LED, or vice versa. Another potential sequence would be to enable/blink the chassis LED and then enable/blink the receiving port LED, or vice versa. The duration field 295 may indicate how long the enable and/or blinking function should occur. Put another way, the duration field 295 may specify when to reset the port LED configurations, and thereby allow the solution to reset itself after a specified amount of time.

A further example field not shown in FIG. 2 that may be included in the port/chassis LED enable TLV 230 is an enable all port LEDs field. As the name suggests, this field allows an administrator to cause all port LEDs associated with a switch to illuminate, and thereby make a single switch among a plurality of switches more apparent. Alternatively or in addition, an associated blink field and/or duration field may be included to enable the administrator to cause all port LEDs to blink and/or control the duration of the illumination/blinking.

Figure 3:
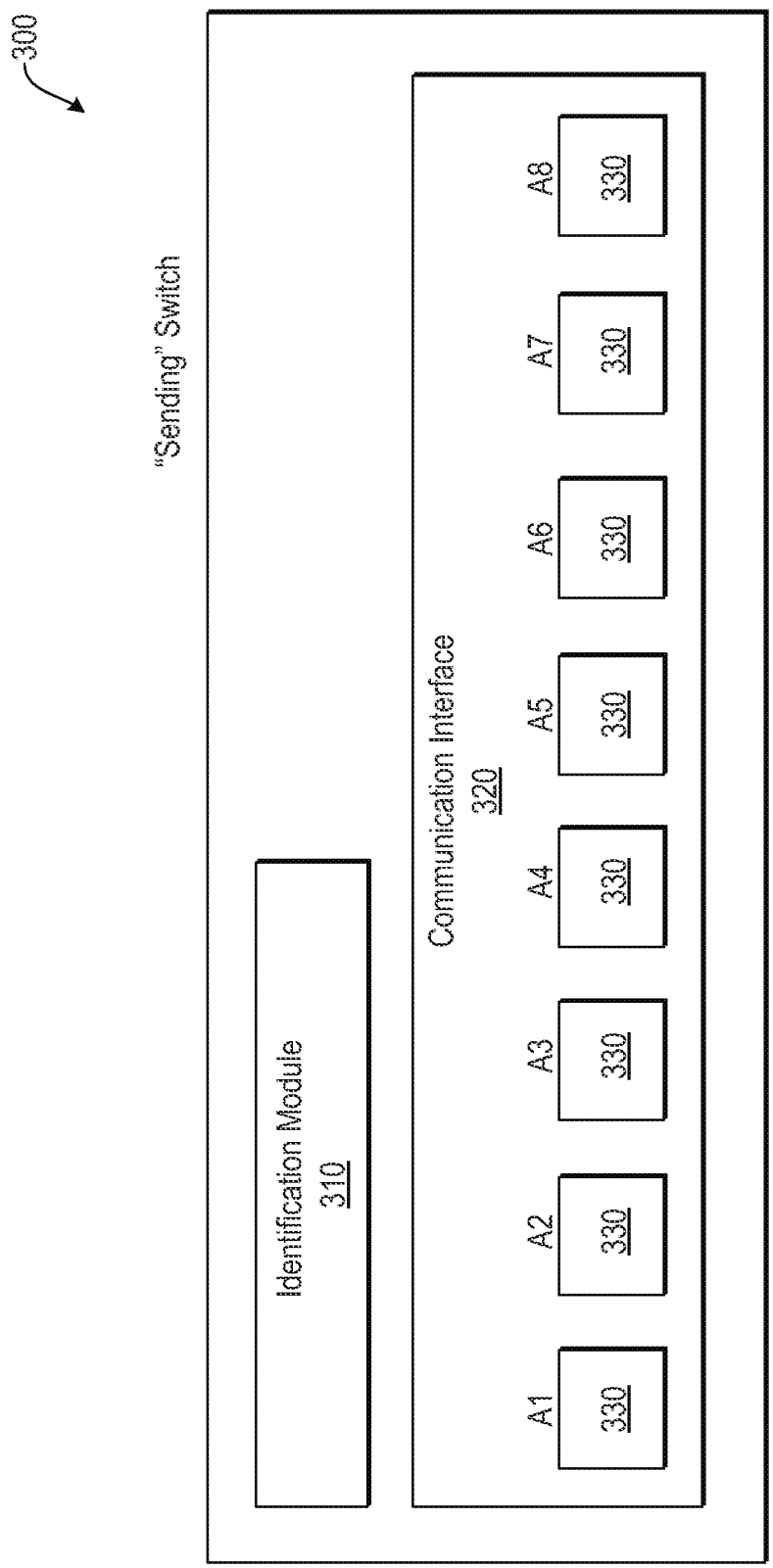
FIG. 3 depicts an example "sending" switch in accordance with an implementation.

FIG. 3 depicts an example "sending" switch 300 in accordance with an implementation. The switch 300 comprises an identification module 310, a communication interface 320, and a plurality of ports 330. It should be readily apparent that the switch 300 represents a generalized illustration and that other components may be added or existing components may be removed, modified, or rearranged without departing from a scope of the present disclosure. For example, the switch 300 may comprise other components such as PHYs, schedulers, light sources, buffers, and the like.

The communication interface 320 may be generally understood as an interface that enables the switch 300 to communicate with other devices e.g., an admin node, another switch, etc.). For example, the communication interface 320 interface may comprise ports 330. PHYs, transmitters, receivers, transceivers, antennas, or the like, or combination thereof. The communication interface 320 may be configured to communicate on wired/wireless networks, local area networks (LANs), wide area network (WANs), telecommunication networks, the Internet, an Intranet, computer networks. Bluetooth networks, Ethernet networks, token ring LANs, Inter-Integrated Circuit (I²C) networks, serial advanced technology attachment (SATA) networks, and/or serial attached SCSI (SAS) networks. Such networks may utilize mediums including, but not limited to, copper, fiber optics, coaxial, unshielded twisted pair, shielded twisted pair, heliax, radio frequency (RF), infrared (IR), and/or microwave, to name a few.

The switch 300 may utilize the communication interface 320 to receive a command from an admin node. The command may comprise desired identification information. For example, an administrator may cause an admin node to issue a command to the switch 300 to identify a port on another switch (e.g., identify the port on another switch connected to port A6 on the switch 300). This may be helpful, for example, in a situation where a remote administrator desires to identify both ends of a cable to a technician on-site in a data center. The identification module 310 may receive the command from the communication interface 320 and process the command to extract the desired identification information. Based at least in part on the desired identification information, the communication interface 320 may generate a LLDP frame, such as the frame depicted in FIG. 2. Once the frame is generated, the identification module 310 may transmit the LLDP frame to another switch via the communication interface 320.

As mentioned above, the identification module 310 may comprise hardware, software, or a combination thereof. For example, and as discussed below with respect to FIG. 6, the identification module 310 may comprise a memory with instructions stored thereon that, when executed by a processor, cause the switch 300 to perform above-mentioned functions such as generating a LLDP frame. Alternatively or in addition, the identification module 310 may comprise a functionally equivalent circuit like an analog circuit, digital signal processing device circuit, ASIC, CPLD, or the like that causes the switch 300 to perform the above-mentioned functions.

Figure 4:
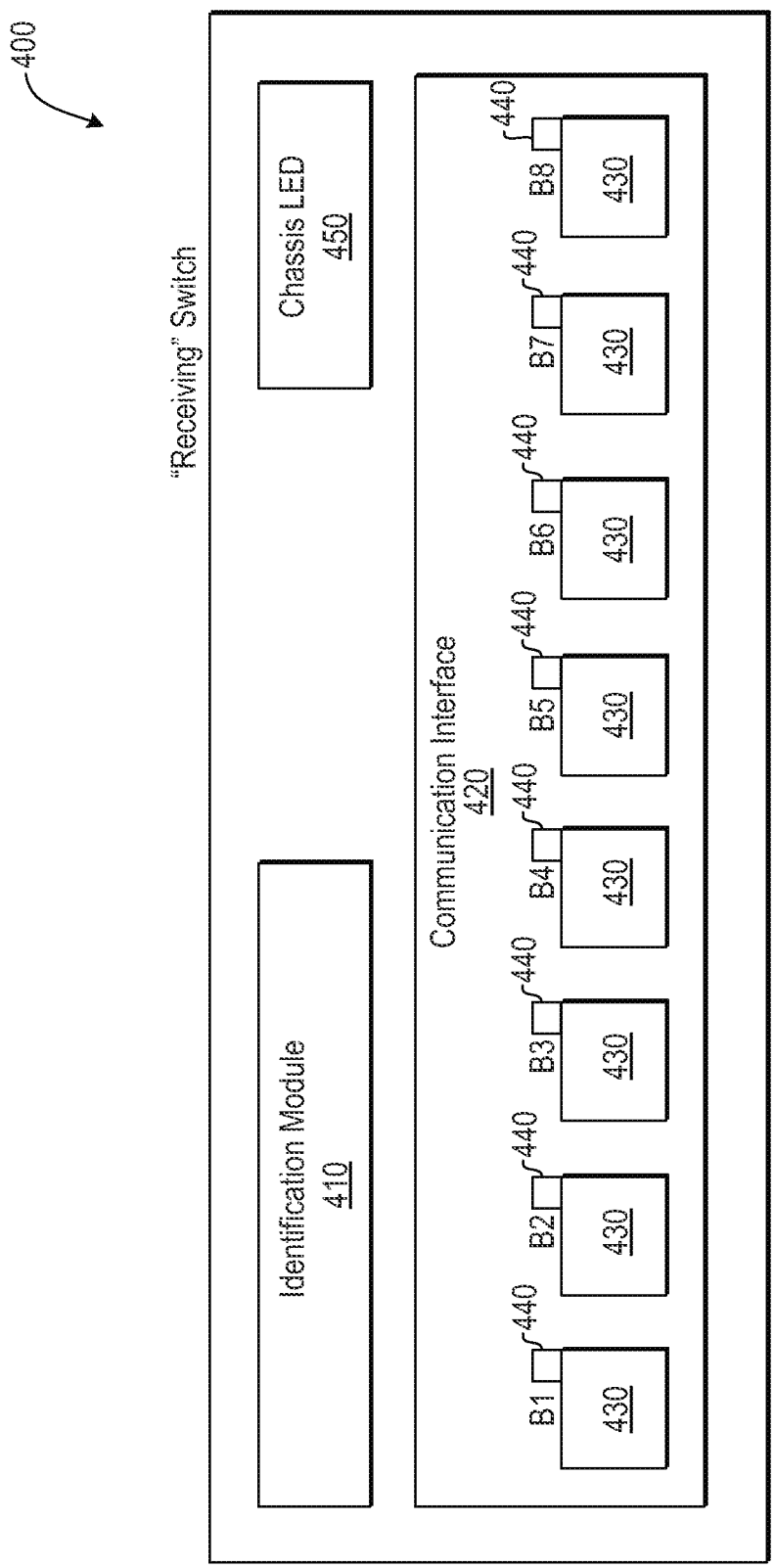
FIG. 4 depicts an example "receiving" switch in accordance with an implementation.

FIG. 4 depicts an example "receiving" switch 400 in accordance with an implementation. The switch 400 comprises an illumination module 410, a communication interface 420, a plurality of ports 430, a plurality of port light sources 440, and a chassis light source 450. It should be readily apparent that the switch 400 represents a generalized illustration and that other components may be added or existing components may be removed, modified, or rearranged without departing from a scope of the present disclosure. For example, the switch 400 may comprise other components such as PHYs, schedulers, buffers, or the like.

The communication interface 420 of FIG. 4 may be similar to the communication interface 320 described above with respect to FIG. 3, but with the addition of a light source 440 associated with each port 430. The light source 440 may be, for example, one or more light emitting devices (LEDs), incandescent lights, fluorescent lights, neon lights, or the like, or combination thereof. These types of light sources may also be applicable to the chassis light source 450.

The communication interface 420 may receive a LLDP frame from a sending switch via, e.g., an Ethernet cable. The LLDP frame may comprise an optional type-length-value (TLV). The optional TLV may comprise, for example, a TLV type, TLV length, organizationally unique identifier, organizationally defined subtype, port enable and disable instruction, blink instruction, and duration instruction. The LLDP frame may then pass from the communication interface 420 to the illumination module 410 via an internal bus (not shown). The illumination module 410 may process the LLDP frame to determine the optional TLV, and, based on at least in part on the optional TLV, cause the switch 400 to perform an identification function. As mentioned above, the identification function may comprise for example, enabling or blinking a port light source 440 associated with the port that 430 that received the LLDP frame. Alternatively or in addition, the identification function may comprise enabling/blinking the receiving port light source 440 and disabling all other port light sources 440 associated with the switch 400. Alternatively or in addition, the identification function may comprise enabling/blinking the chassis locator light source 450. Alternatively or in addition, the identification function may comprise enabling/blinking all port light sources 440 (e.g., ports B1-B8). Alternatively or in addition, the identification function may comprise blinking all port light sources 440 (e.g., ports B1-B8) and then blinking the receiving port light source 440 (e.g., port B5) associated with the switch 400, or vice versa.

Similar to the identification module 310 in FIG. 3, the illumination module 410 in FIG. 4 may comprise hardware, software, or a combination thereof. For example, and as discussed below with respect to FIG. 6, the illumination module 410 may comprise a memory with instructions stored thereon that, when executed by a processor, cause the switch 400 to perform the above-mentioned functions such as extracting an optional TLV from a LLDP frame and causing the switch to perform an identification function. Alternatively or in addition, the illumination module 410 may comprise a functionally equivalent circuit like an analog circuit, digital signal processing device circuit, ASIC, CPLD, or the like that cause the switch 400 to perform the above-mentioned functions.

Figure 5:
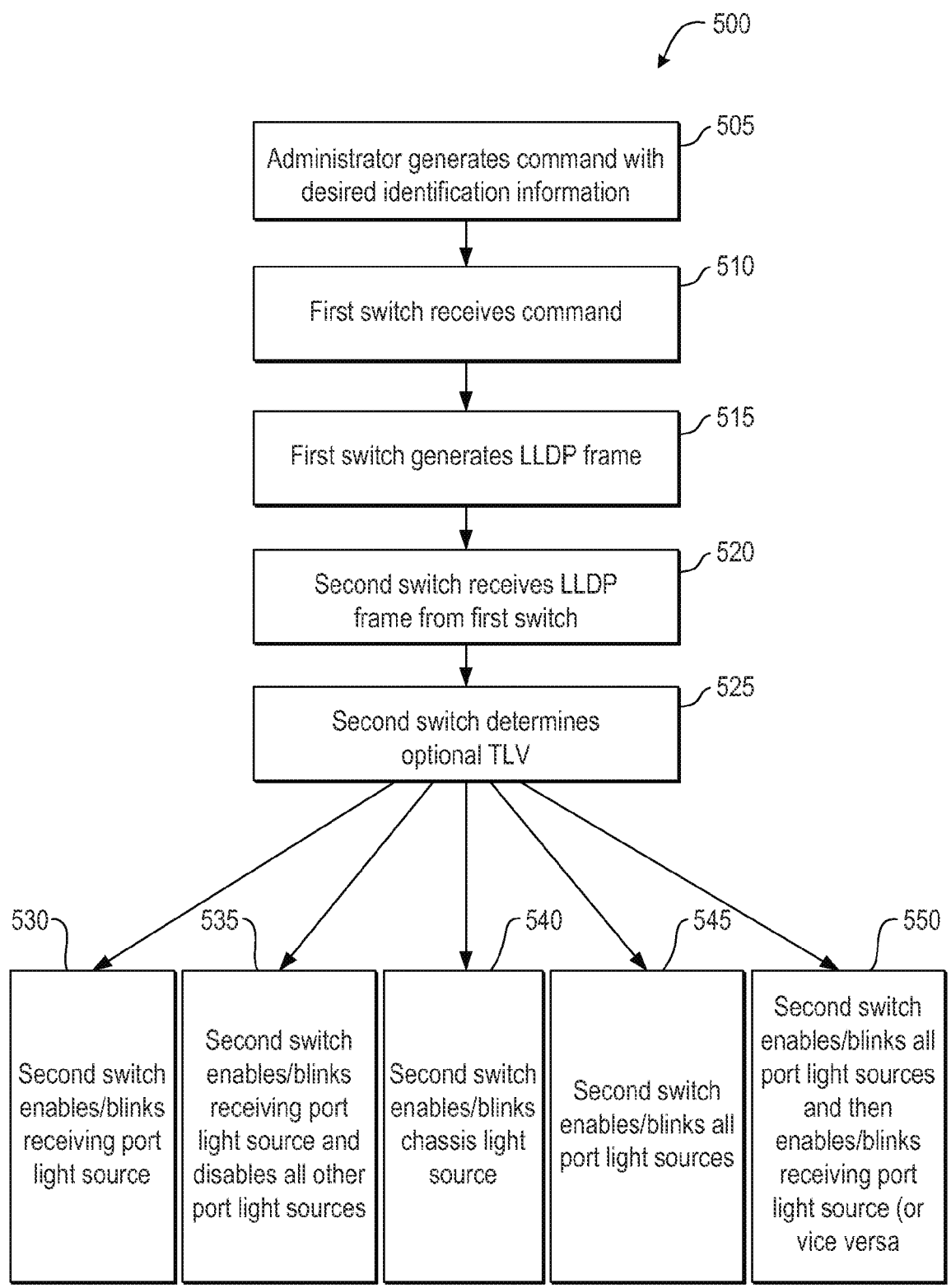
FIG. 5 depicts an example process flow diagram in accordance with an implementation.

FIG. 5 depicts an example process flow diagram 500 in accordance with an implementation. It should be readily apparent that the processes depicted in FIG. 5 represent generalized illustrations, and that other processes may be added or existing processes may be removed, modified, or rearranged without departing from the scope and spirit of the present disclosure. In addition, it should be understood that the processes may represent instructions stored on mac line-readable storage medium that may cause a processor to respond, to perform actions, to change states, and/or to make decisions. Alternatively or in addition, the processes may represent functions and/or actions performed by functionally equivalent circuits like an analog circuit, a digital signal processing device circuit, an ASIC, or other devices (e.g., a communication interface) associated with a switch. Furthermore. FIG. 5 is not intended to limit the implementation of the present disclosure, but rather the figure illustrates functional information that one skilled in the art could use to design/fabricate circuits, generate software, or use a combination of hardware and software to perform the illustrated processes.

The process may begin at block 505, when an administrator associated with an admin node generates a command with desired identification information. As mentioned above, the administrator may be, e.g., a person such as a network administrator and/or an automated process. As further mentioned above, the desired identification information may be, e.g., a request to identify the port on another switch. This port may be coupled via an Ethernet cable to the switch that receives the command from the admin node. For example, the desired identification information may be to identify the port and/or switch coupled to port A6 on the switch that receives the command from the admin node.

At block 510, a first switch receives the command with the desired identification information from the admin node. The first switch may receive the command via a wired/wireless communication interface in accordance with a communication protocol (e.g., TCP/IP, 802.11, etc,). Depending on the implementation, the admin node may be located proximate to the first switch or at a location remote from the first switch.

At block 515, an identification module of the first switch may receive the command with the desired identification information from the communication interface. The identification module may then proceed to generate a LLDP frame based at least in part on the desired identification information. This process may include extracting or otherwise determining the desired identification information from the command, and including aspects of the desired identification information within the LLDP frame. Such aspects included in the LLDP frame may be, for example, the output port of the first switch (i.e., the port which will output the LLDP frame and the port which the administrator desires to identify its connection endpoint), the identification action (e.g., enable/blink receiving port LED, enable/blink chassis LED, enable/blink receiving port LED and disable other port LEDs, and/or sequentially enable all port LEDs and enable/blink receiving port LED), and/or specifics about the identification action (e.g., duration, illumination color, and/or blink frequency). Such information may be included within an optional TLV of the LLDP frame with, e.g., a TLV type, TLV length, organizationally unique identifier, organizationally defined sub-type, port enable and disable instruction, blink instruction, and/or duration instruction. Thereafter, the first switch may transmit the generated LLDP frame to a second switch. In particular, the first switch may transmit the LLDP frame from a port identified in the command received from the admin node.

At block 520, the second switch may receive the LLDP frame from the first switch. In particular, at least one port of the second switch may be coupled to at least one port of the first switch via a wired communication medium (e.g., an Ethernet cable), and the second switch may receive the LLDP frame via this cable and via a communication interface similar to the communication interface described above with respect to the first switch.

At block 530, an illumination module of the second switch may receive the LLDP frame from the communication interface of the second switch. The illumination module may then parse, extract, or otherwise process the LLDP frame to determine the above-mentioned optional TLV which may include, e.g., an identification action (e.g., enable/blink receiving port LED, enable/blink chassis LED, enable/blink receiving port LED and disable other port LEDs, sequentially enable all port LEDs and enable/blink receiving port LED, etc.) and specifics about the identification action (e.g., duration, illumination color, and/or blink frequency).

Based on the contents of the optional TLV, the illumination module of the second switch may proceed to conduct at least one of the processes described in blocks 530-550. In particular, at block 530, the illumination module may cause a light source associated with the receiving port of the second switch to enable/blink. At block 535, the illumination module may cause a light source associated with the receiving port of the second switch to enable/blink and further cause the light sources associated with all other ports of the second switch (or a specific portion thereof) to temporarily disable. At block 540, the illumination module may cause a chassis light source associated with the second switch to enable/blink. At block 545, the illumination module may cause all port light sources associated with the second switch to enable/blink. At block 550, the illumination module may sequentially cause a light source associated with the receiving port of the second switch to enable/blink and then cause the light sources associated with all other ports of the second switch to enable/blink (or vice versa).

As a consequence of the above-mentioned processes, an administrator can efficiently and effectively signal port interconnections to a technician on-site. As a result, the technician does not have to resort to tugging on cabling and/or color-coding cabling in order to identify interconnections among a web of cabling in a network closet. Thus, efficiencies with respect to time may be increased while decreasing the likelihood of equipment damage.

Figure 6:
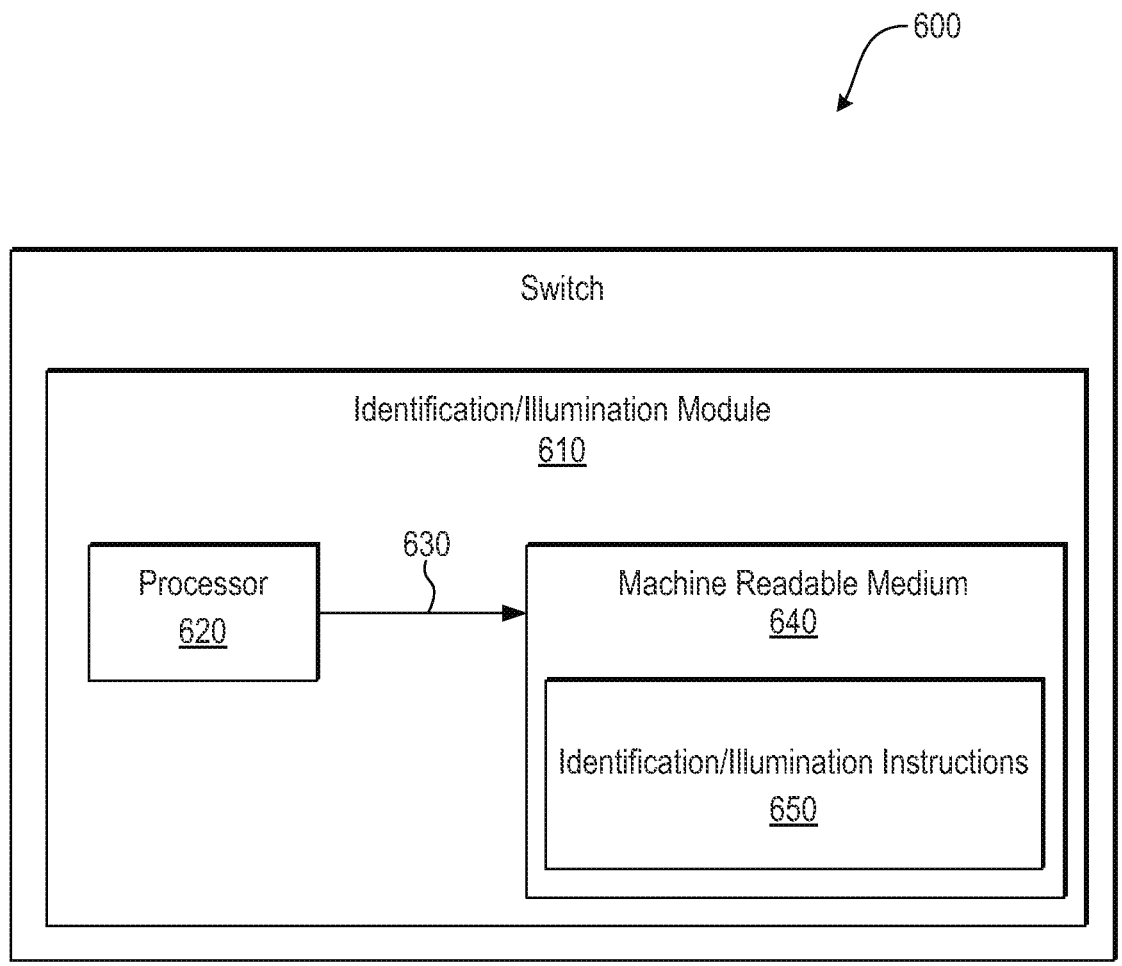
FIG. 6 depicts an example switch comprising a non-transitory computer readable medium that stores instructions for operating a switch in accordance with an implementation.

FIG. 6 depicts an example switch 600 comprising a non-transitory computer readable medium that stores instructions for operating the switch 600 in accordance with an implementation. For the sake of brevity. FIG. 6 depicts aspects of both the above-mentioned first "sending" switch and second "receiving" switch (see FIGS. 1 and 3-5). However, it should be understood that identification module and identification instructions are associated with the first "sending" switch and the illumination module and illumination instructions are associated with the second "receiving" switch.

The example switch 600 comprises an identification module or an illumination module 610. The module 610 may comprise a processor 620 and a non-transitory machine-readable medium 630. The processor 620 and a non-transitory machine-readable medium 640 may be connected via a bus 630. The non-transitory machine-readable medium 640 may correspond to any typical storage device that stores instructions, such as programming code or the like. For example, the non-transitory computer-readable medium 630 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that may be executed by the processor 620. In this case, the non-transitory machine-readable medium 640 may be a portable medium such as a CD, DVD, or flash drive or a memory maintained by a server from which the installation package can be downloaded and installed. In another implementation, the instructions may be part of an application or application already installed.

The processor 620 may be may be at least one of a central processing unit (CPU), a semiconductor-based microprocessor, a field-programmable gate array (FPGA) configured to retrieve and execute instructions, other electronic circuitry suitable for the retrieval and execution instructions stored on a machine-readable storage medium, or a combination thereof. The processor 620 may fetch, decode, and execute instructions stored on the storage medium 640 to operate the switch 600 in accordance with the above-described examples. In one example implementation, the processor 620 may access the machine-readable medium 640 via the bus 630 to cause the switch 600 to process a command to determine desired identification information; generate a link LLDP frame based at least in part on the desired identification information, wherein the LLDP frame comprises an optional type-length-value (TLV) that causes a second switch to enable a light source; and transmit the LLDP to the second switch. In another example implementation, the processor 620 may access the machine-readable medium 640 via the bus 630 to cause the switch 600 to receive a LLDP frame from the communication interface; process the LLDP frame to determine the optional TLV; and cause, based on at least in part on the optional TLV, the switch 600 to perform an identification function.

While the above disclosure has been shown and described with reference to the foregoing examples, it should be understood that other forms, details, and implementations may be made without departing from the spirit and scope of the disclosure that is defined in the following claims.

What is claimed is:

1. A switch comprising:
a communication interface to receive a command via a network; and
an identification module to:
receive the command from the communication interface;
extract from the command identification information, wherein the identification information specifies a port of the communication interface;
generate a link layer discovery protocol (LLDP) frame based at least in part on the identification information, wherein the LLDP frame comprises an optional type-length-value (TLV) that causes a second switch to perform an identification function, wherein the identification function comprises blinking a plurality of port light sources associated with the second switch and then blinking one of the plurality of port light sources associated with the second switch while disabling other port light sources of the plurality of port light sources associated with the second switch, wherein the one of the plurality of port light sources is associated with a port of the second switch that is connected to the port of the switch that is specified in the identification information; and
transmit the LLDP frame to the second switch via the port of the communication interface specified in the command.

2. The switch of claim an 1, wherein the one of the plurality of port light sources is blinked for a time period specified in the optional TLV.

3. The switch of claim 1, wherein the identification function further comprises at least one of enabling a chassis locator light source associated with the second switch and blinking the chassis locator light source associated with the second switch, wherein the chassis locator light source is distinct from the plurality of port light sources of the second switch.

4. The switch of claim 1, wherein the optional TLV comprises a TLV type, a TLV length, an organizationally unique identifier, an organizationally defined subtype, and a port light source enable instruction.

5. A switch comprising:
a communication interface to receive a link layer discovery protocol (LLDP) frame, wherein the LLDP frame comprises an optional type-length-value (TLV) that causes the switch to perform an identification function;
a plurality of port light sources each of the port light sources corresponding to a different port of the switch; and
an illumination module to:
receive the LLDP frame from the communication interface;
process the LLDP frame to determine the optional TLV, wherein the optional TLV comprises a port light source blink instruction and an all other port light source blink instruction; and
cause, based on at least in part on the optional TLV, the switch to perform the identification function;
wherein the identification function comprises blinking the plurality of port light sources and then blinking one of the plurality of port light sources while disabling other port light sources of the plurality of port light sources, wherein the one of the plurality of port light sources is associated with one of the ports of the switch through which the communication interface receives the LLDP frame.

6. The switch of claim 5, wherein the blinking the one of the plurality of port light sources while disabling the other port light sources of the plurality of port light sources is performed for a time period specified by the optional TLV.

7. A non-transitory machine readable medium comprising instructions which, when executed, cause a switch to:

extract, from a command received via a network, identification information, wherein the identification information specifies a port of the switch;

generate a link layer discovery protocol (LLDP) frame based at least in part on the identification information, wherein the LLDP frame comprises an optional type-length-value (TLV) that causes a second switch to perform an identification function, wherein the identification function comprises blinking a plurality of port light sources associated with the second switch and then blinking one of the plurality of port light sources associated with the second switch while disabling other port light sources of the plurality of port light sources associated with the second switch, wherein the one of the plurality of port light sources is associated with a port of the second switch that is connected to the port of the switch that is specified in the identification information; and transmit the LLDP frame to the second switch via the port of the switch specified in the command.

8. The non-transitory machine readable medium of claim 7, wherein the optional TLV comprises a TLV type, a TLV length, an organizationally unique identifier, an organizationally defined subtype, and at least one of a port light source enable instruction, a port light source blink instruction, an all other ports light source enable instruction, an all other ports light source blink instruction, a chassis light source enable instruction, a chassis light source blink instruction, a light source sequence instruction, and a duration instruction.

9. The non-transitory machine readable medium of claim 7, wherein the second switch is connected to the switch via an Ethernet cable.

\* \* \* \* \*